US012719798B2

(12) United States Patent
Zacks et al.

(10) Patent No.: US 12,719,798 B2
(45) Date of Patent: Aug. 25, 2026

(54) DYNAMICALLY ENABLING A TRANSPORT CONTROL PROTOCOL PROXY FOR SATELLITE NETWORKS

(71) Applicant: Cisco Technology, Inc., San Jose, CA (US)

(72) Inventors: David John Zacks, Vancouver (CA); Jeff Apcar, Willoughby (AU); Oliver Boehmer, Welt (DE); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 18/586,355

(22) Filed: Feb. 23, 2024

(65) Prior Publication Data

US 2024/0244003 A1 Jul. 18, 2024

Related U.S. Application Data

(63) Continuation of application No. 17/747,359, filed on May 18, 2022, now Pat. No. 11,936,564.

(51) Int. Cl.
*H04W 28/02* (2009.01)
*H04B 7/185* (2006.01)
(Continued)

(52) U.S. Cl.
CPC ....... *H04L 47/193* (2013.01); *H04B 7/18502* (2013.01); *H04L 69/16* (2013.01)

(58) Field of Classification Search
None
See application file for complete search history.

(56) References Cited

U.S. PATENT DOCUMENTS 8,929,217 B2 1/2015 Torres
9,231,697 B2 1/2016 Archer
(Continued)

FOREIGN PATENT DOCUMENTS

CN 114020395 A 2/2022

OTHER PUBLICATIONS

PCT Search Report and Written Opinion mailed Aug. 24, 2023 for PCT application No. PCT/US23/22482, 31 pages.
(Continued)

*Primary Examiner* — Sithu Ko
(74) *Attorney, Agent, or Firm* — Lee & Hayes, P.C.

(57) ABSTRACT

Techniques for a TCP proxy to communicate over a LEO satellite network on behalf of a client device by selecting a TCP congestion-control algorithm that is optimal for the LEO satellite network based on the time of day and/or location of the TCP proxy. Based on the locations of satellites during the day as they traverse predefined and patterned orbital paths, different TCP congestion-control algorithms may be more optimized to communicate data through the LEO satellite network. However, client devices generally use a single TCP congestion-control algorithm to communicate over WAN networks. Accordingly, a TCP proxy may be inserted on, for example, a router to communicate with the client device using a TCP congestion-control algorithm that the client device is configured to use, but then communicate over the LEO satellite network using a different TCP congestion-control algorithm that is optimal based on the time of day and/or other factors.

17 Claims, 6 Drawing Sheets

(51) Int. Cl.
*H04L 47/193* (2022.01)
*H04L 69/16* (2022.01)

(56) References Cited

U.S. PATENT DOCUMENTS

| | | | | |
|---|---|---|---|---|
| 9,774,385 | B2 | 9/2017 | Foxworthy | |
| 9,826,066 | B2 | 11/2017 | Ramaiah | |
| 10,172,032 | B2 * | 1/2019 | Roy | H04W 76/10 |
| 10,200,922 | B2 | 2/2019 | Fang | |
| 10,419,962 | B2 * | 9/2019 | Axmon | H04W 24/10 |
| 10,931,587 | B2 | 2/2021 | Kulkarni | |
| 11,012,361 | B2 * | 5/2021 | Ramachandran | H04L 69/163 |
| 11,595,113 | B1 | 2/2023 | Dickinson et al. | |
| 11,671,341 | B2 * | 6/2023 | Jain | H04L 43/062 709/224 |
| 11,689,944 | B2 | 6/2023 | Vasudevan | |
| 12,335,125 | B2 * | 6/2025 | Tourrilhes | H04L 43/0894 |
| 2008/0144504 | A1 | 6/2008 | Marcondes et al. | |
| 2008/0151917 | A1 | 6/2008 | Bartlett et al. | |
| 2009/0316581 | A1 * | 12/2009 | Kashyap | H04L 45/28 370/236 |
| 2015/0334088 | A1 | 11/2015 | Luo et al. | |
| 2017/0117999 | A1 | 4/2017 | Weston et al. | |
| 2017/0289838 | A1 | 10/2017 | Agrawal et al. | |
| 2018/0013683 | A1 | 1/2018 | Wang et al. | |
| 2020/0112362 | A1 | 4/2020 | Roy et al. | |
| 2020/0236043 | A1 | 7/2020 | Sze et al. | |
| 2020/0304606 | A1 | 9/2020 | Tourrilhes et al. | |
| 2020/0358668 | A1 | 11/2020 | Kumaran et al. | |
| 2021/0067452 | A1 | 3/2021 | Ramachandran et al. | |
| 2021/0204152 | A1 * | 7/2021 | Vasudevan | G06N 3/0475 |
| 2022/0103483 | A1 * | 3/2022 | Shah | H04L 47/19 |
| 2023/0344764 | A1 * | 10/2023 | Kassahun | H04L 45/123 |
| 2023/0379258 | A1 | 11/2023 | Zacks | |
| 2024/0080091 | A1 * | 3/2024 | Kim | H04L 1/1812 |

OTHER PUBLICATIONS

Office Action for U.S. Appl. No. 17/747,359, mailed on Jul. 10, 2023, David John Zacks, "Dynamically Enabling a Transport Control Protocol Proxy for Satellite Networks", 18 pages.

Peng, et al., "TCP Performance Evaluation over GEO and LEO Satellite Links between Performance Enhancement Proxies", Vehicular Technology Conference (VTC Fall), 2012 IEEE, IEEE, Sep. 3, 2012, 1-5 pages.

* cited by examiner

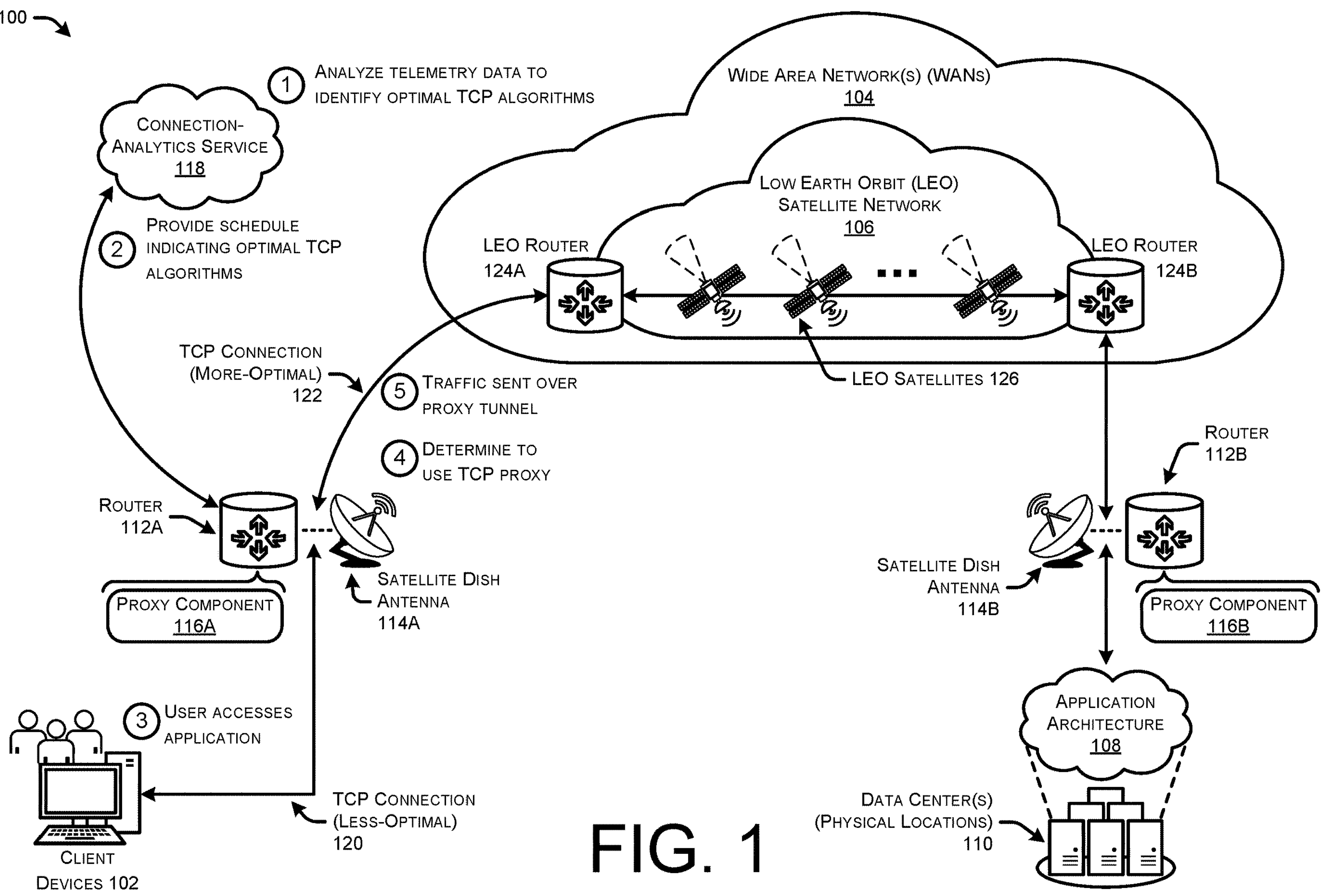
100
Analyze telemetry data to
identify optimal TCP algorithms
Connection-
Analytics Service
118
Wide Area Network(s) (WANs)
104
Low Earth Orbit (LEO)
Satellite Network
106
Provide schedule
indicating optimal TCP
algorithms
LEO Router
124A
LEO Router
124B
TCP Connection
(More-Optimal)
122
Traffic sent over
proxy tunnel
LEO Satellites 126
Determine to
use TCP proxy
Router
112B
Router
112A
Satellite Dish
Antenna
114A
Satellite Dish
Antenna
114B
Proxy Component
116A
Proxy Component
116B
User accesses
application
Application
Architecture
108
TCP Connection
(Less-Optimal)
120
Data Center(s)
(Physical Locations)
110
Client
Devices 102
FIG. 1

| Throughput 302 | Congestion Control Algorithm 304 | Latency 306 | Loss 308 |
|---|---|---|---|
| 2.35 Gb/s | Cubic | <1ms | 0% |
| 195 Mb/s | Reno | 140ms | 0% |
| 347 Mb/s | Cubic | 140ms | 0% |
| 344 Mb/s | Westwood | 140ms | 0% |
| 340 Mb/s | BBR | 140ms | 0% |
| 1.13 Mb/s | Reno | 140ms | 1.5% (SRC > DEST) |
| 1.23 Mb/s | Cubic | 140ms | 1.5% (SRC > DEST) |
| 2.46 Mb/s | Westwood | 140ms | 1.5% (SRC > DEST) |
| 160 Mb/s | BBR | 140ms | 1.5% (SRC > DEST) |
| 0.65 Mb/s | Reno | 140ms | 3% (SRC > DEST) |
| 0.78 Mb/s | Cubic | 140ms | 3% (SRC > DEST) |
| 0.97 Mb/s | Westwood | 140ms | 3% (SRC > DEST) |
| 132 Mb/s | BBR | 140ms | 3% (SRC > DEST) |

DYNAMICALLY ENABLING A TRANSPORT CONTROL PROTOCOL PROXY FOR SATELLITE NETWORKS

RELATED APPLICATIONS

This patent application is a continuation of and claims priority to U.S. patent application Ser. No. 17/747,359, filed May 18, 2022, which is fully incorporated herein by reference.

TECHNICAL FIELD

The present disclosure relates generally to communications of data over satellite networks using Transport Control Protocol (TCP) tunnels.

BACKGROUND

Wide area networks, or "WANs," are telecommunication networks that connect and enable computing devices to communicate over large geographic areas. Computing devices use WANs, such as the Internet, to communicate with each other over large distances on a daily basis. Generally, WANs are used to connect local area networks (LANs) with each other using edge or border routers, which are devices that route packets over lines that span between LAN locations. A classic example of a use case for a WAN is to connect an enterprise LAN network over a large geographic area to services hosted in a datacenter.

More recently, Software-defined WANs (SD-WANs) have been introduced to help make WAN architectures easier to deploy, operate, and manage. SD-WAN technologies utilize virtualization, application-level policies and overlay networks, and software platforms to increase data-transfer efficiencies across WANs by moving traffic to lower-cost network links to do the work of more-expensive leased lines. Various WAN and SD-WAN technologies are used to communicate data packets between devices and across WANs. For instance, these technologies include packet switching methods, Transport Control Protocol (TCP), Internet Protocol (IP), overlay networks, Multiprotocol Label Switching (MPLS) techniques, and so forth. Using these technologies, a first router can connect a first LAN over a WAN with a second router located within a second LAN.

Traditionally, the networking infrastructure used to communicate data between routers and across WANs is fairly static. That is, while networking components might be spun up or spun down to scale with traffic demand in a WAN, the locations and networks in which the network components are located, as well as the wired and/or wireless connections between the components, are fairly static. In this way, the communication protocols used by networking components to communicate over WANs were designed with the luxury of a fairly static and stable infrastructure as far as geographic location and distance is concerned.

While WAN networks are effective in delivering network connectivity to most users, there are many users in remote locations, unsupported countries or regions, and/or other areas that do not have reasonable access to WAN networks. Accordingly, various enterprises and organizations have developed and deployed satellite WAN networks that are composed of hundreds or thousands of satellites that orbit earth.

Satellite networks are able to provide WAN connectivity to these remote or unsupported users because all that is required is a satellite dish, a router, and a clear line of sight to one or more of the orbiting satellites. The router uses the satellite dish to transmit satellite signals, or "beams," to an orbiting satellite, which then relays the signal to another satellite in the network and/or another router associated with a destination of the signal. Some of the original satellite communication networks are geosynchronous in operation in that the satellites rotated around the Earth at roughly the same speed as the Earth rotates. However, the original satellite networks were located at a fairly high altitude above the Earth (e.g., 40,000 kilometers (km)), and this resulted in limited bandwidth and poor performance as the round-trip-time was long and limited by the speed of light.

More recently there has been an emergence of Low Earth Orbit (LEO) satellite constellations which are satellite networks that consist of thousands of small satellites in low Earth orbit (e.g., 500 km in altitude). Some of these LEO satellite networks are not geosynchronous, but are constantly moving relative to the Earth, and thus constantly moving relative to routers and satellite dishes on Earth. The satellites in these LEO satellite networks are arranged in a grid (or constellation) that move in unison according to predefined patterns or orbital paths. These LEO satellite networks provide improved bandwidth, reduced latency, and smaller spot coverage due to the closer satellite location as well as the movement of the satellites relative to locations on Earth.

As noted above, communication protocols used in WAN networks have been designed for WAN infrastructures with network components and communication paths that are largely static, or stationary. However, LEO satellite networks include grids of satellites that are constantly moving relative to the routers and satellite dishes on Earth with which they communicate. These traditional communication protocols were not designed or optimized to communicate across WANs with moving network components. Further, because the speed of light propagates faster in a vacuum, such as outer space, the satellites in these LEO satellite networks prefer to handoff signals between the satellites until the signal reaches a satellite closer to the destination device on Earth for transmission back to Earth. However, because the satellites are in a grid that moves according orbital paths, the distances between the satellites are constantly becoming shorter or longer as the satellites move along their respective paths.

Accordingly, as the signal is passed off between satellites with varying differences in distances, there are resulting variances in delays and potentially higher packet loss. Therefore, communication protocols may not be properly designed or optimized to handle communications over LEO satellite networks which may result in performance degradation of the communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a system-architecture diagram of an example WAN that includes a LEO satellite network over which a client device utilizes a router and satellite dish to communicate with an application architecture.

DESCRIPTION OF EXAMPLE EMBODIMENTS

Overview

Figure 2:
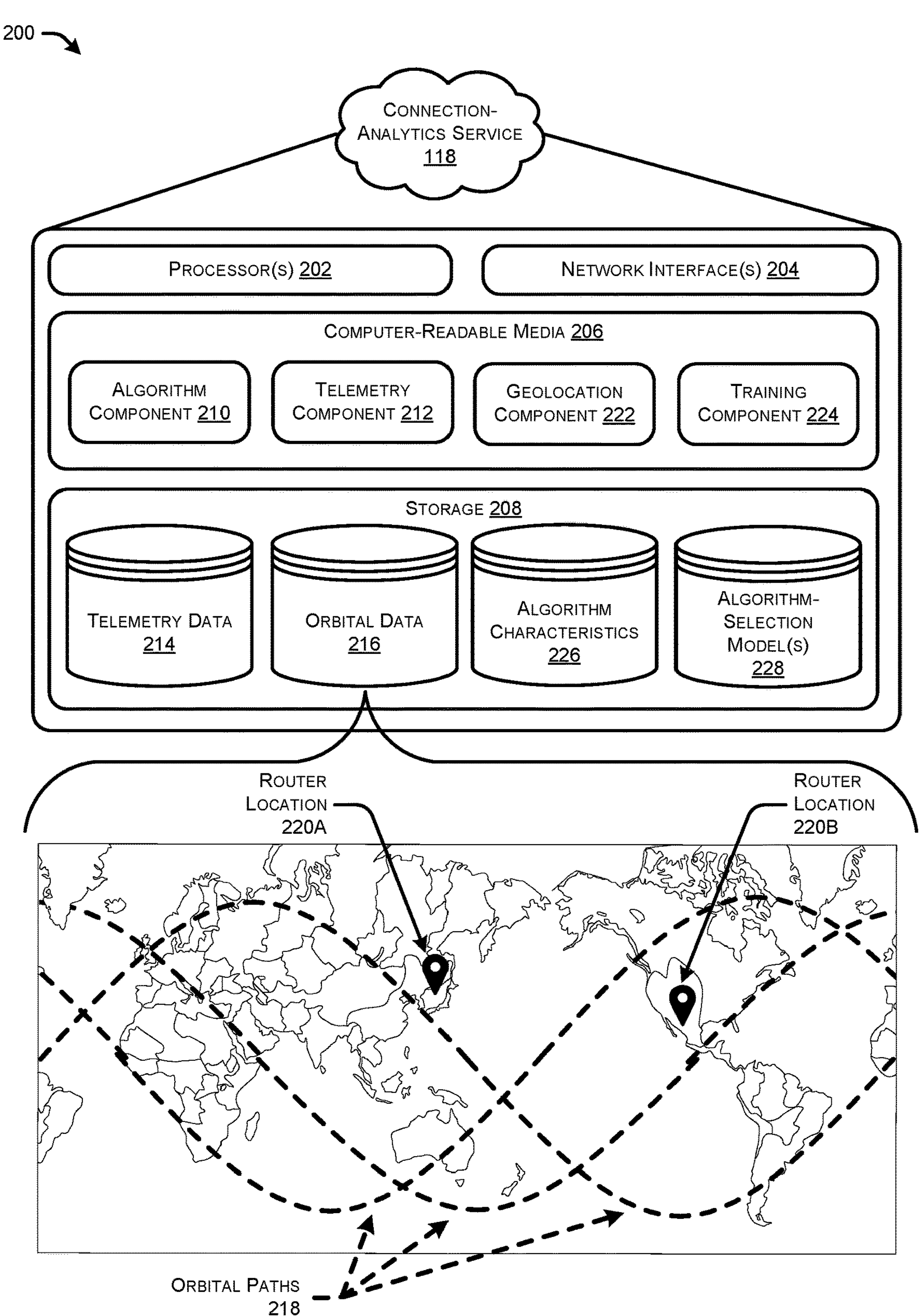
FIG. 2 illustrates a component diagram of an example connection-analytics service that determines optimal TCP congestion-control algorithms to use at different geographic locations and at different times during a time to communicate over a LEO satellite network.

This disclosure describes techniques for a routing device to act as a Transport Control Protocol (TCP) proxy for a client device. A method to perform techniques described herein includes receiving, from the client device, a request to communicate data over one or more Wide Area Networks (WANs) to a destination device, the one or more networks including a low Earth orbit (LEO) satellite network. The method may further include establishing a first TCP connection with the client device where the first TCP connection utilizes a first TCP congestion-control algorithm. Additionally, the method may include determining that a second TCP congestion-control algorithm is more optimized than the first TCP congestion-control algorithm for transmitting the data over the LEO satellite network. Further, the method may include establishing a second TCP connection with a remote device associated with the destination device where the second TCP connection utilizes the second TCP congestion-control algorithm. Additionally, the method may include receiving the data from the client device via the first TCP connection, and sending the data to the remote device using the second TCP connection.

Additionally, the techniques described herein may be performed by a system and/or device having non-transitory computer-readable media storing computer-executable instructions that, when executed by one or more processors, performs the method described above.

Example Embodiments

This disclosure describes techniques for a TCP proxy to communicate over a LEO satellite network on behalf of a client device where the TCP proxy selects a TCP congestion-control algorithm that is optimal for performance characteristics of the LEO satellite network based on the time of day and/or location of the TCP proxy. The locations of satellites in a LEO satellite network constantly change relative to Earth during the day as they traverse their predefined and patterned orbital paths. Due to this, different TCP congestion-control algorithms may be more optimized for use in communicating data through the LEO satellite network at different times of the day and/or at different locations on Earth. However, client devices generally use a single TCP congestion-control algorithm to communicate data over WAN networks. Accordingly, a TCP proxy may be inserted on, for example, a WAN router to communicate with the client device using a first TCP congestion-control algorithm that the client device is configured to use, but then communicate the data over the LEO satellite network using a second TCP congestion-control algorithm that is optimal based on the time of day, geographic location of the TCP proxy, and/or other factors.

To communicate using LEO satellite networks, user devices generally need to send the data they would like communicated to a WAN router that utilizes a satellite dish to transmit signals to a satellite in the LEO satellite network. In some examples, a provider or controller or the LEO satellite network may provide users, often customers, with the required routers and/or satellite dishes to enable users to communicate over the LEO satellite network using their client devices. Computing devices, such as client devices, are configured to communicate over WANs using the TCP/IP suite of communication protocols. However, the computing devices are generally only configured to communicate over WANs using a single TCP congestion-control algorithm.

Over the years, there have been many attempts to improve the performance of TCP, which is ultimately fundamental to the performance of communicating over WANs, particularly the Internet. These efforts include the introduction of various TCP-based congestion-control algorithms. As their name suggests, TCP congestion-control algorithms are used as network congestion-avoidance schemes that help avoid or control congestion in WANs. There are numerous variations and versions of TCP congestion-control algorithms that are implemented in protocol stacks of operating systems of computing devices that connect to WANs. Typically, a client device is configured to use one TCP congestion-control algorithm when communicating over WANs using the TCP/IP protocol suite. Some of the more popular TCP congestion-control algorithms include TCP Cubic, TCP Reno, TCP Vegas, TCP Tahoe and Reno, TCP Westwood, TCP Bottleneck Bandwidth and Round-trip propagation time (BBR), among many others. The different TCP congestion-control algorithms have different impacts on performance, and some congestion-control algorithms have better or worse performance depending on network behaviors and characteristics.

While network behaviors and characteristics of WANs may be relatively stable due to the static nature of traditional WAN infrastructure, LEO satellite WAN networks have an infrastructure of satellites that are constantly moving relative to the routers and satellite dishes on Earth with which they communicate. Thus, a particular TCP congestion-control algorithm may be optimized, or satisfactory, for communicating over a LEO satellite network during one period of the day, but as the satellites move relative to the router and satellite dish, a different TCP congestion-control algorithm may be optimized during a different period of the day. Accordingly, client devices that are configured to communicate using a single TCP congestion-control algorithm may suffer communication performance degradation during different periods of time of the day when communicating over LEO satellite networks.

The techniques described herein include determining optimized TCP congestion-control algorithms for communicating over LEO satellite networks for different times of the day at various geographical locations across Earth. Depending on where client devices are located, and on the orbital paths that the satellites take in a LEO satellite network, different TCP congestion-control algorithms may be more or less optimized to use to communicate at different times of the day.

According to the techniques described herein, a connection-analytics service may analyze telemetry data collected from WAN routers that communicate over LEO satellite networks to determine what TCP congestion-control algorithms are optimal for different geographic locations and for different time periods in a day. As noted above, WAN routers may utilize satellite dishes to transmit signals to the satellites in the LEO satellite network. The WAN routers may monitor and maintain various metrics or telemetry data indicating a performance of those communication sessions. For instance, the WAN routers may monitor characteristics such as round-trip-time (RTT), packet loss, latency, available bandwidth, jitter, and/or other characteristics indicative of network performance. The telemetry data may be timestamped based on when it was generated, and the WAN router may send the telemetry data, timestamp data, geolocation data indicating a geolocation of the WAN router, and an indication of the TCP congestion-control algorithm that was used to communicate to the connection-analytics service.

As noted above, users of LEO satellite networks may be provided with, or otherwise obtain, necessary WAN routers and satellite dishes to communicate with the satellites. These WAN routers are able to communicate on behalf of many different types of client devices (or other computing devices) that are configured to use different TCP congestion-control algorithm With many users across the Earth using the LEO satellite network, and those users having different client devices that are configured to communicate using different TCP congestion-control algorithm, the connection-analytics service is able to determine how well different TCP congestion-control algorithms perform for different geographic locations and at different times of the day. The connection-analytics service may analyze the telemetry data, geographic data, timestamp data, and TCP congestion-control algorithms used to generate models (e.g., machine-learning (ML) models, rule-based models, etc.) that indicate which TCP congestion-control algorithm is optimal to use based on the time of day and/or geographic location.

In order to communicate data over the LEO satellite network using an optimized TCP congestion-control algorithm at different times of the day, a TCP proxy may be placed on, or instantiated on, the WAN routers. The TCP proxy may be configured to communicate over the LEO satellite networks using various TCP congestion-control algorithms on behalf of the client devices. According to the techniques described herein, a client device may connect to the WAN router and attempt to establish a TCP/IP connection using a particular congestion-control algorithm over the LEO satellite network according to traditional techniques. The TCP proxy may be provided with the model(s) generated by the connect-analytics service that indicate which TCP congestion-control algorithm is optimal to use based on the time of day and/or geographic location at which the TCP proxy is located.

Using the model(s), the TCP proxy may determine whether or not the TCP congestion-control algorithm used by the client device is optimal for communicating over the LEO satellite network. In examples where the client device's TCP congestion-control algorithm is optimal for communicating over the LEO satellite network at the particular time of day and geographic location, the TCP proxy may simply allow the client device to communicate over the LEO satellite network per usual. However, in some instances the TCP proxy may determine that a TCP congestion-control algorithm other than the one used by the client device is more optimized for communicating at the particular time of day. In such examples, the TCP proxy may be configured to terminate the TCP/IP connection with the client device at the WAN router on which the TCP proxy is running, and respond to packets sent from the client device with spoof packets (e.g., spoof acknowledgment packets). The TCP proxy may then establish a second connection over the LEO satellite network using the optimized TCP congestion-control algorithm for that time of day and geographic location. In this way, the client device need not be changed or configured differently, but a TCP proxy may be placed on the WAN router (or other device) such that an optimized TCP congestion-control algorithm can be used to communicate over a LEO satellite network.

Although the techniques described herein are primarily with respect to TCP congestion-control algorithms, the techniques are equally applicable for different communication protocols (e.g., different transport protocols, different tunneling protocols, etc.) and/or for different congestion-control algorithms (or other communication algorithms or schemes). Further, although the techniques are described with reference to a WAN router running the proxy, the proxy could be located anywhere between the client device and a satellite in a LEO satellite network, including the client device. Further, in some instances, rather than training and using model(s) that have been trained using historical telemetry data, the TCP proxy may instead (or in addition to) engage the proxy functionality based on where the satellites are going to be and the measure performance on the group.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example WAN that includes a LEO satellite network over which a client device utilizes a router and satellite dish to communicate with an application architecture.

The system-architecture diagram 100 illustrates one or more client devices 102 that are configured to communicate over one or more WANs 104 that includes a LEO satellite network 106 with an application architecture 108 hosted in one or more data centers 110. The client devices 102 may comprise any type of device configured to communicate using various communication protocols (e.g., short range protocols, TCP/IP, User Datagram Protocol (UDP), tunneling protocols, and/or any other protocol) over various networks. For instance, the client devices 102 may comprise one or more of personal user devices (e.g., desktop computers, laptop computers, phones, tablets, wearable devices, entertainment devices such as televisions, etc.), network devices (e.g., servers, routers, switches, access points, etc.), and/or any other type of computing device.

The WAN 104 may include one or more networks implemented by any viable communication technology, such as wired and/or wireless modalities and/or technologies. The WAN 104 may each include or connect any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The WAN 104 may include devices, virtual resources, or other nodes that relay packets from one network segment to another by nodes in the computer network.

As illustrated, the WAN 104 may include a LEO satellite network 106 that includes a plurality of LEO satellites 126 (e.g., hundreds or thousands of satellites). The small satellites in the LEO satellite network 106 may consist of thousands of small satellites in low Earth orbit (e.g., 500 km in altitude). The LEO satellite network 106 may be constantly moving relative to the Earth, and thus constantly moving relative to routers 112A and 112B and satellite dishes 114A and 114B on Earth. The satellites 126 in the LEO satellite network 106 may be arranged in a grid (or constellation) and move in unison according to predefined patterns or orbital paths. These LEO satellite network 106 may provide improved bandwidth, reduced latency, and smaller spot coverage due to the closer satellite 126 location as well as the movement of the satellites 126 relative to locations on Earth. Because the speed of light propagates faster in a vacuum, such as outer space, the satellites 126 in the LEO satellite network 106 may handoff signals between the satellites 126 until the signals reach a satellite 126 closer to the destination device on Earth for transmission back to Earth. In some examples, the satellites may be 126 in a grid that moves according orbital paths, and in such examples, the distances between the satellites 126 are constantly becoming shorter or longer as the satellites 126 move along their respective paths.

To communicate over LEO satellite network 106, the client devices 102 generally need to send the data they would like communicated to a WAN router 112A that utilizes a satellite dish 114A to transmit signals to a satellite 126 in the LEO satellite network 106. In some examples, a provider or controller or the LEO satellite network 106 may provide users, often customers, with the required routers 112 and/or satellite dishes 114 to enable users to communicate over the LEO satellite network 106 using their client devices 102. The client devices 102 are configured to communicate over WANs using the TCP/IP suite of communication protocols. However, the client devices 102 may be configured to communicate over WANs 104 using a single TCP congestion-control algorithm.

At "1," a connection-analytics service 118 may analyze telemetry data collected from WAN routers 112 that communicate over the LEO satellite network 106 to determine what TCP congestion-control algorithms are optimal for different geographic locations and for different time periods in a day. There may be WAN routers 112 and associated satellite dish antenna 114 all over the Earth that transmit signals to the satellites 126 in the LEO satellite network 106 to communicate with other devices. The WAN routers 112 may monitor and maintain various metrics or telemetry data indicating a performance of those communication sessions. For instance, the WAN routers 112 may monitor characteristics such as round-trip-time (RTT), packet loss, latency, available bandwidth, jitter, and/or other characteristics indicative of network performance. The telemetry data may be timestamped based on when it was generated, and the WAN router 112 may send the telemetry data, timestamp data, geolocation data indicating a geolocation of the WAN router 112, and an indication of the TCP congestion-control algorithm that was used to communicate to the connection-analytics service. With many users across the Earth using the LEO satellite network 106, and those users having different client devices 102 that are configured to communicate using different TCP congestion-control algorithm, the connection-analytics service 118 is able to determine how well different TCP congestion-control algorithms perform for different geographic locations and at different times of the day. The connection-analytics service 118 may analyze the telemetry data, geographic data, timestamp data, and TCP congestion-control algorithms used to generate models (e.g., machine-learning (ML) models, rule-based models, etc.) that indicate which TCP congestion-control algorithm is optimal to use based on the time of day and/or geographic location.

At "2," the connection-analytics service 118 may provide schedules or models to the routers 112 that indicate optimal TCP congestion-control algorithms to use based on the geographic location of the routers 112 and/or the time of day. The routers 112 may simply utilize these schedules or models to determine, based on their geolocation and the time of day (and/or other parameters), what TCP congestion-control algorithm is more optimized for communicating over the LEO satellite network 106. Additionally, or alternatively, the router 112 may take into account the type of content being transmitted on behalf of the client device 102 to determine which TCP congestion-control algorithm is most optimized.

At "3," a user of an application on the client device 102 may access the application, and the application may begin establishing a TCP/IP connection over the WAN 104 and LEO satellite network 106 with the application architecture 108. The TCP connection 120 may be established using whatever TCP congestion-control algorithm the client device 102 is configured to use, which may be less-optimal for communicating over the LEO satellite network 106 for this time of day at this location.

The router 112A may be executing a proxy component 116A that is configured to determine, using various rules and/or models, whether or not a TCP congestion-control algorithm used by the client device 102 is optimal for communicating over the LEO satellite network. The proxy component 116A may be configured to intercept TCP connections 120 that are attempting to be made by client devices 102 over the LEO satellite network 106. In examples where the client device's 102 TCP congestion-control algorithm is optimal for communicating over the LEO satellite network 106 at the particular time of day and geographic location, the proxy component 116A may simply allow the client device 102 to communicate over the LEO satellite network 106 per usual.

However, in some instances the proxy component 116A may determine that a TCP congestion-control algorithm other than the one used by the client device 102 is more optimized for communicating at the particular time of day. In such examples, the proxy component 116A may at "5," be configured to terminate the less optimal TCP connection 120 with the client device 120 at the router 112A on which the proxy component 116A is running, and respond to packets sent from the client device 102 with spoof packets (e.g., spoof acknowledgment packets). The proxy component 116A may then determine a more optimal TCP congestion-control algorithm for the time of day and/or geographic location, and establish a more-optimal TCP connection 122 over the LEO satellite network 106 using the optimized TCP congestion-control algorithm. In this way, the client device 102 need not be changed or configured differently, but a proxy component 116A may be placed on the WAN router 112A (or other device) such that an optimized TCP congestion-control algorithm can be used to communicate over the LEO satellite network 106.

As illustrated, the router 112B may also be executing a proxy component 112B that corresponds to the proxy component 116A and performs similar, or the same, functionality. The proxy component 116B may establish the TCP proxy tunnel with the proxy component 116A such that the proxy tunnel is terminated on the routers 112A and 112B. Similarly, the proxy component 116B may spoof local ack packets to the application architecture 108, and perform buffering, retransmission, etc. Accordingly, there may be corresponding proxy component 112 on either side of the proxy tunnel as described herein. The proxy components 116A and 116B may each be able to perform the techniques described herein for establishing a proxy tunnel and either initiating a tunnel, or receiving the request to establish a tunnel, and act as proxies for the client devices 102 and application architecture (or any type of sending and receiving devices). The techniques performed by the proxy components 116 on the routers 112 generally need to be performed on each side of the ELO satellite network 106.

Generally, the application architecture 108 may include devices houses or located in the one or more data centers 110 that may be located at different physical locations. For instance, the application architecture 108 may be supported by networks of devices in a public cloud computing platform, a private/enterprise computing platform, and/or any combination thereof. The one or more data centers 110 may be physical facilities or buildings located across geographic areas that designated to store networked devices that are part of the application architecture 108. The data centers 110 may include various networking devices, as well as redundant or backup components and infrastructure for power supply, data communications connections, environmental controls, and various security devices. In some examples, the data centers 110 may include one or more virtual data centers which are a pool or collection of cloud infrastructure resources specifically designed for enterprise needs, and/or for cloud-based service provider needs.

Although the techniques of FIG. 1 are described with reference to client devices 102 communicating with an application architecture 108, the techniques are generally appliable for any devices that communicate across a LEO satellite network 106. Additionally, while the techniques are described with respect to a client device 102 reaching out to, for example, a service in an application architecture 108, the techniques are also applicable for the reverse situation where a server in an application architecture 108 is reaching out or initiating a conversation with the client devices 102.

FIG. 2 illustrates a component diagram 200 of an example connection-analytics service 118 that determines optimal TCP congestion-control algorithms to use at different geographic locations and at different times during a time to communicate over a LEO satellite network 106.

In some examples, the connection-analytics service 118 may operate as a remote service that analyzes various data and determines, for different geographic locations, what TCP congestion-control algorithm is optimized to communicate across a LEO satellite network 106 at different times of the day and/or other parameters. The connection-analytics service 118 may be a cloud-based, enterprise-based service, and/or another type of accessible service. However, in some instances the connection-analytics service 118 may be software that is package and able to run on the routers 112 themselves such that the routers can analyze the various data to identify optimized TCP congestion-control algorithms.

As illustrated, the connection-analytics service 118 may include one or more hardware processors 202 (processors), one or more devices, configured to execute one or more stored instructions. The processor(s) 202 may comprise one or more cores. Further, the connection-analytics service 118 may include one or more network interfaces 204 configured to provide communications between the connection-analytics service 118 and other devices, such as the client devices 102 and/or other devices and systems or devices. The network interfaces 204 may include devices configured to couple to personal area networks (PANs), wired and wireless local area networks (LANs), wired and wireless wide area networks (WANs), and so forth.

The connection-analytics service 118 may also include computer-readable media 206 that stores various executable components (e.g., software-based components, firmware-based components, etc.). The computer-readable-media 206 may further store or be used to execute components to implement functionality described herein. While not illustrated, the computer-readable media 206 may store one or more operating systems utilized to control the operation of the one or more devices that comprise the connection-analytics service 118. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the connection-analytics service may include storage 208 which may comprise one, or multiple, repositories or other storage locations for persistently storing and managing collections of data such as databases, simple files, binary, and/or any other data. The storage 208 may include one or more storage locations that may be managed by one or more database management systems.

The computer-readable media 206 may store portions, or components, of the connection-analytics service 118 described herein. For instance, the computer-readable media 206 may store an algorithm component 210 that selects which TCP congestion-control algorithms to use based on the various analysis performed on performance data. The CRM 206 may store and help execute a telemetry component 212 that receives and analyzes various telemetry data. For instance, the telemetry component 212 may communicate with client devices 102, application architecture 108, and/or other entities to collect telemetry data 214 associated with communications performed using TCP connections over LEO satellite networks 106. The telemetry data 214 may include, as non-limiting and non-exhaustive examples, round-trip-time (RTT), packet loss, latency, available bandwidth, jitter, and/or other characteristics indicative of network performance. The telemetry data 214 may be timestamped based on when it was generated, and the router 112 may send, to the connection-analytics service 118, the telemetry data 214 along with at least timestamp data, geolocation data indicating a geolocation of the router 112, and an indication of the TCP congestion-control algorithm that was used to communicate over the LEO satellite network 106. In some instances, the routers 112 may also provide other attributes, such as a length of time of the communication session, type(s) of data communicated (e.g., audio, video, etc.), and/or other attributes.

The CRM 206 may include a geolocation component 222 that is configured to determine and monitor the geographic locations of routers 112 and/or other devices that are communicating over LEO satellite networks 106. The geolocation component 222 may receive, or proactively obtain, geolocation information from the routers 112 (or any other devices) to determine at what geolocations previous communications were performed, and also at what locations the routers 112 are now at when communicating.

The CRM 206 may store or include a training component 224 that is configured to train one or more algorithm-selection models 228 for use in determining what TCP congestion-control algorithm is optimized for communicating over a LEO satellite network 106 based on the geolocation of the transmissions, a time of day, and/or other parameters. For instance, the training component 224 may train the algorithm-selection models 228 using training data, such as the telemetry data 214, to determine which TCP congestion-control algorithms had the best performance at different locations and at different times of the day.

The storage may further include orbital data 216 that indicates orbital paths 218 and/or movement patterns of satellites 126 in the LEO satellite network 106. Further, the storage 208 may store algorithm characteristics 226 which indicate how different TCP congestion-control algorithms perform under different network conditions. In some examples, the algorithm component 210 may be configured to determine which TCP congestion-control algorithm is optimized, or predict which TCP congestion-control algorithm would be optimized, based on the orbital data 216, geographic locations of transmission devices, and the algorithm characteristics 226. For instance, the algorithm component 210 may determine where the satellites 126 will be relative to devices on the Earth at different times of the day based on the orbital paths 218 and rotation of the Earth. By predicting this, the algorithm component 210 may determine how the network performance will be for routers 112 at different geolocations at different times of the day, and predict which TCP congestion-control algorithm is optimized to communicate over the LEO satellite network 106 based on various algorithm characteristics (e.g., some algorithms are optimized for queuing and delays, some algorithms are optimized for low throughput, some algorithms are optimized for packet loss or jitter, and so forth).

Figure 3:
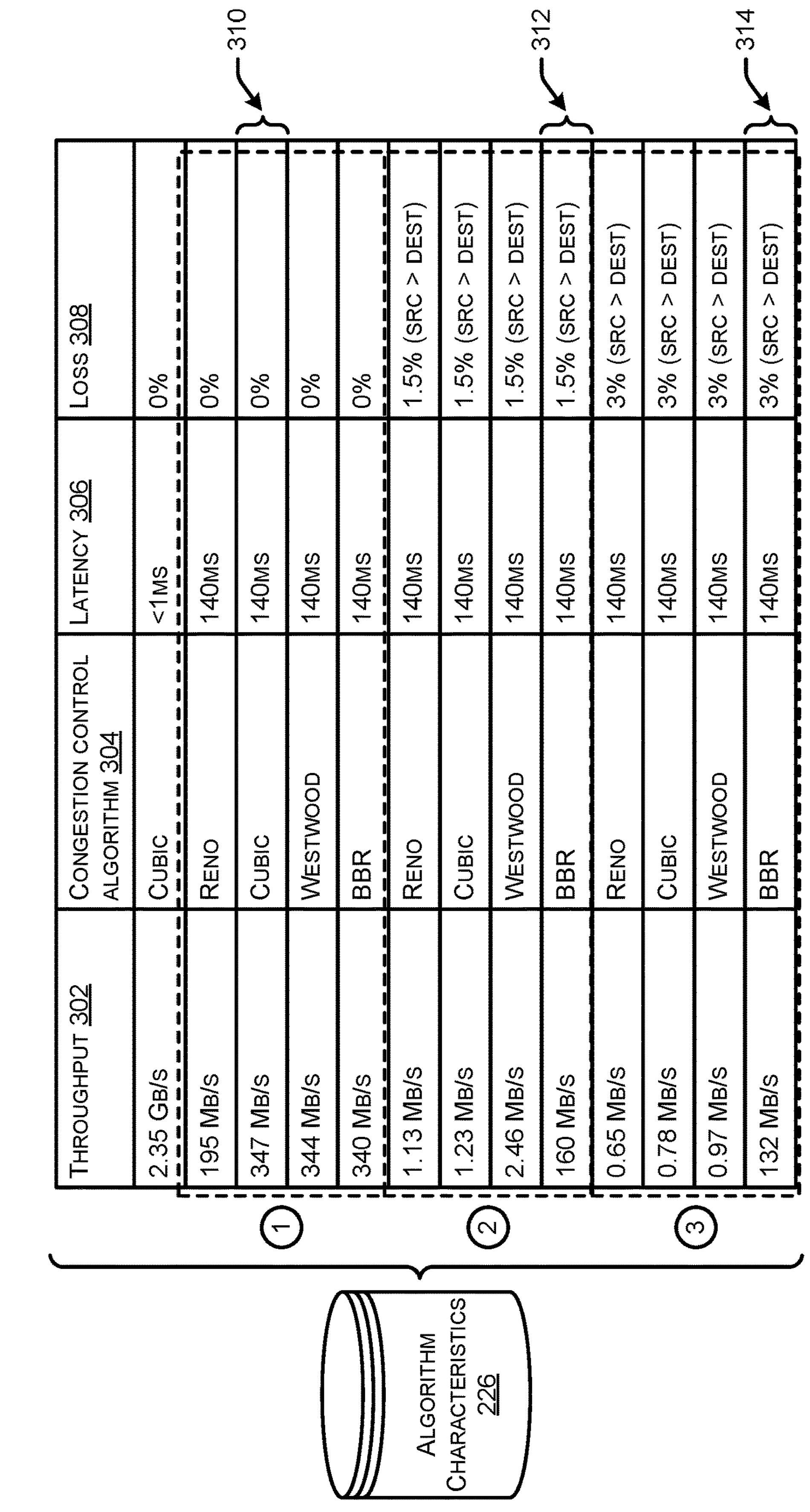
FIG. 3 illustrates an example listing of characteristics of different TCP congestion-control algorithms used by devices when communicating over a LEO satellite network.

FIG. 3 illustrates an example listing 300 of characteristics 226 of different TCP congestion-control algorithms used by devices when communicating over a LEO satellite network 106. The algorithm characteristics 226 indicate how well different TCP congestion-control algorithms performed under different circumstances (e.g., different times of day, different transmission locations, etc.). The algorithm characteristics 226 include indications of amount of throughput 302 achieved with the TCP congestion-control algorithms, the particular TCP congestion-control algorithm 304 used, an amount of latency associated with using the different TCP congestion-control algorithms, and an amount of loss experienced when using the different TCP congestion-control algorithms. However, additional characteristics, less characteristics, or different characteristics may be used according to the techniques described herein.

In the listing 300, the groupings "1," "2," and "3" may each correspond to measurements taken, or telemetry data for, different TCP congestion-control algorithms used to communicate at different locations and/or at different times of the day. As shown, different TCP congestion-control algorithms perform differently in each of the sets, and different algorithms may be more optimal based on the time of day and/or geographic location.

For instance, in set "1," the TCP congestion-control algorithm Cubic 310 may be the most optimal algorithm as it achieved the best throughput and similar or the same latency and loss. In set "2," the TCP congestion-control algorithm of Bottleneck Bandwidth and Round-trip propagation time (BBR) 312 may be the most optimized as it has the best throughput and similar or the same latency and loss. Similarly, for set "3," the TCP congestion-control algorithm of BBR 312 may again be the most optimized as it has the best throughput and similar or the same latency and loss.

Figure 4:
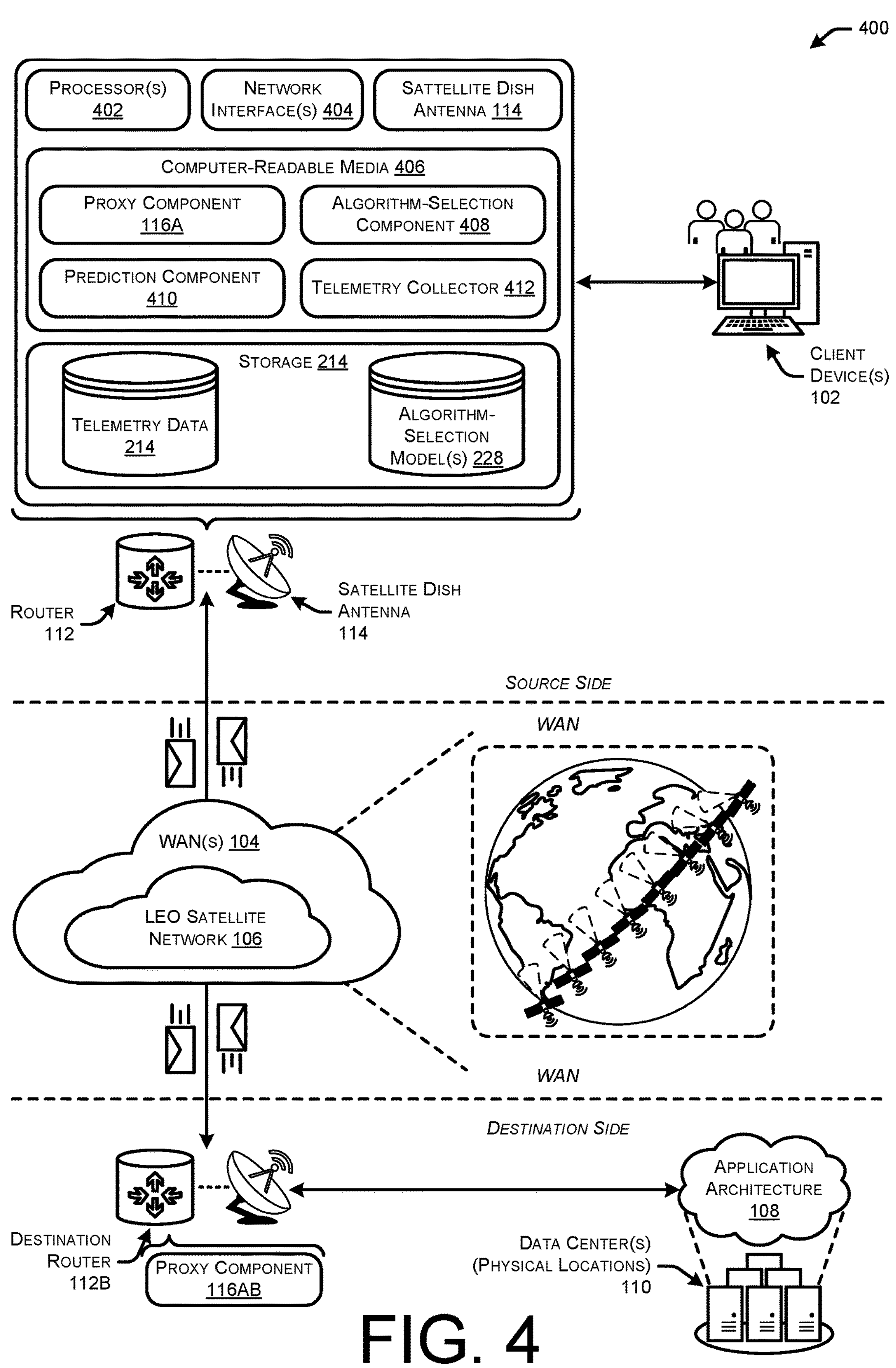
FIG. 4 illustrates a component diagram of an example router that serves as a TCP proxy for a client device and selects an optimal TCP congestion-control algorithm for communicating over LEO satellite networks.

FIG. 4 illustrates a component diagram 400 of an example router 112 that serves as a TCP proxy for a client device 102 and selects an optimal TCP congestion-control algorithm for communicating over LEO satellite networks 106.

Although illustrated as a router 112, such as a WAN router 112, the router 112 may be any device or component configured to communicate (either directly or via another device) over a LEO satellite network 106. As illustrated, the router 112 may include one or more hardware processors 402 (processors), one or more devices, configured to execute one or more stored instructions. The processor(s) 402 may comprise one or more cores. Further, the router 112 may include one or more network interfaces 404 configured to provide communications between the router 112 and other devices, such as the client devices 102, LEO routers 124 located on the edge of LEO satellite networks 106, and/or other devices and systems or devices. The network interfaces 404 may include devices configured to couple to personal area networks (PANs), wired and wireless local area networks (LANs), wired and wireless wide area networks (WANs), and so forth. In some instances, the router 112 may include an internal satellite dish antenna 114, and in other examples, the router 112 may be communicatively coupled to a stand-alone satellite dish antenna 114.

The router 112 may also include computer-readable media 406 that stores various executable components (e.g., software-based components, firmware-based components, etc.). The computer-readable-media 406 may further store or be used to execute components to implement functionality described herein. While not illustrated, the computer-readable media 406 may store one or more operating systems utilized to control the operation of the one or more components of the router 112. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the router 112 may include storage 408 which may comprise one, or multiple, repositories or other storage locations for persistently storing and managing collections of data such as databases, simple files, binary, and/or any other data. The storage 408 may include one or more storage locations that may be managed by one or more database management systems.

The computer-readable media 406 may store portions, or components, of the router 112 described herein. For instance, the computer-readable media 406 may store an algorithm-selection component 408 that selects which TCP congestion-control algorithms to use based on the algorithm-selection models 228 and/or on predictions determined using orbital data 216 and algorithm characteristics 226. The CRM 406 may store and help execute a telemetry collector 412 that collects various telemetry data. For instance, the telemetry collector 412 may monitor TCP communications and sessions and determine or collect telemetry data 214 which may include, as non-limiting and non-exhaustive examples, round-trip-time (RTT), packet loss, latency, available bandwidth, jitter, and/or other characteristics indicative of network performance. The telemetry data 214 may be timestamped based on when it was generated, and the router 112 may send, to the connection-analytics service 118, the telemetry data 214 along with at least timestamp data, geolocation data indicating a geolocation of the router 112, and an indication of the TCP congestion-control algorithm that was used to communicate over the LEO satellite network 106. In some instances, the routers 112 may also provide other attributes, such as a length of time of the communication session, type(s) of data communicated (e.g., audio, video, etc.), and/or other attributes.

The CRM 406 may include a geolocation component (not illustrated) that is configured to determine and monitor the geographic locations of routers 112 and/or other devices that are communicating over LEO satellite networks 106. The geolocation component may use various technologies to determine geolocation, such as Global Positioning Satellite (GPS) systems, cellular networks for triangulation, and/or any methods to determine a geolocation of the router 112.

The CRM 206 may store or include a prediction component 410 that is configured to predict what TCP congestion-control algorithm is optimized for communicating over a LEO satellite network 106 based on the geolocation of the transmissions, a time of day, and/or other parameters. For instance, the prediction component 410 may use the algorithm-selection models 228 to determine which TCP congestion-control algorithms had the best performance at different locations and at different times of the day.

Further, the prediction component 410 may be configured to predict which TCP congestion-control algorithm would be optimized, based on the orbital data 216, geographic locations of the router 112, and the algorithm characteristics 226. For instance, the prediction component 410 may determine where the satellites 126 will be relative to devices on the Earth at different times of the day based on the orbital paths 218 and rotation of the Earth. By predicting this, the algorithm component 210 may determine how the network performance will be for the router 112 at different geolocations at different times of the day, and predict which TCP congestion-control algorithm is optimized to communicate over the LEO satellite network 106 based on various algorithm characteristics (e.g., some algorithms are optimized for queuing and delays, some algorithms are optimized for low throughput, some algorithms are optimized for packet loss or jitter, and so forth).

Figure 5:
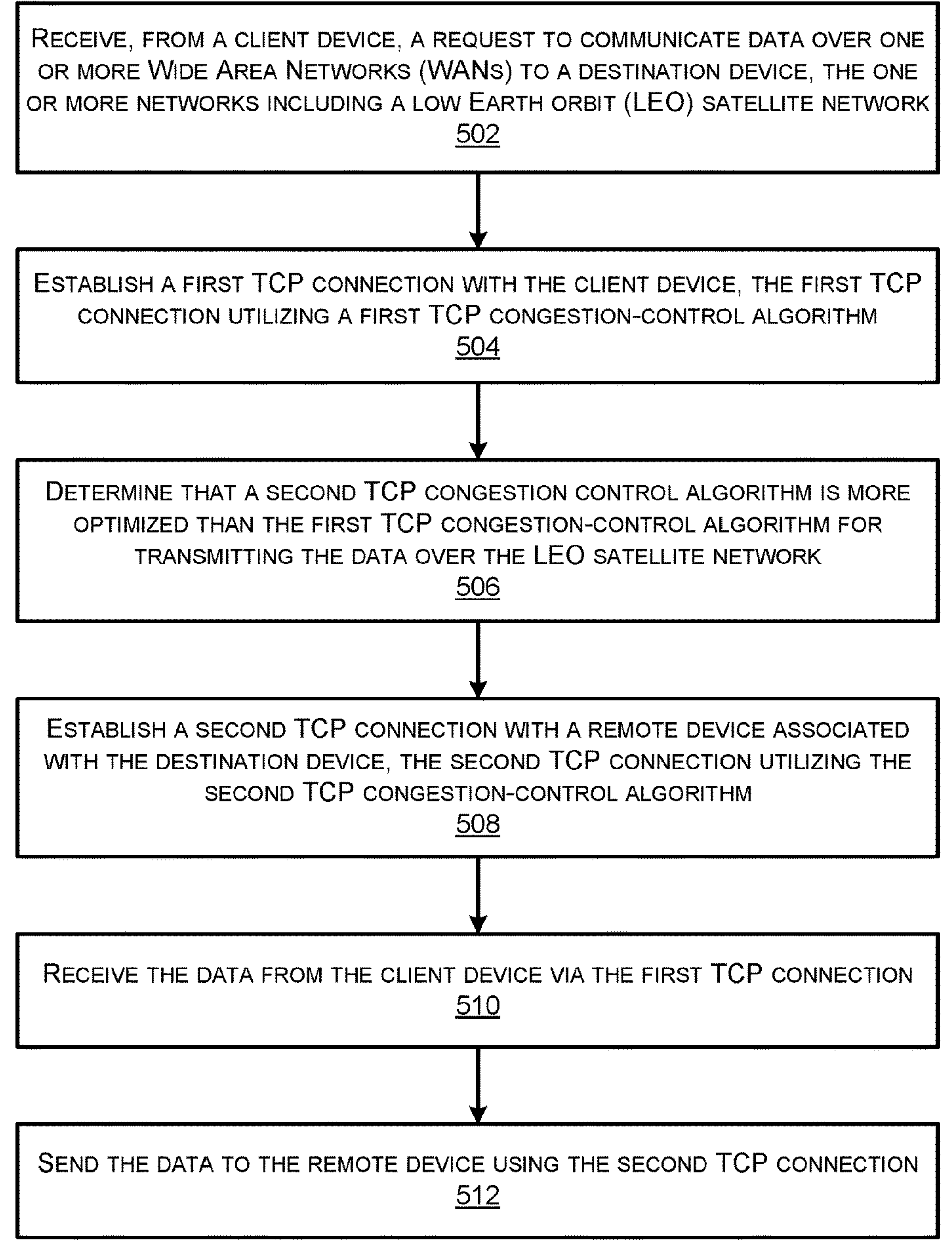
FIG. 5 illustrates a flow diagram of an example method for a router to act as a TCP proxy for a client device and select an optimal TCP congestion-control algorithm for communicating over LEO satellite networks.

FIG. 5 illustrates a flow diagram of an example method 500 that illustrates aspects of the functions performed at least partly by the devices in the distributed application architecture as described in FIGS. 1-4. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 5 illustrates a flow diagram of an example method 500 for a router to act as a TCP proxy for a client device and select an optimal TCP congestion-control algorithm for communicating over LEO satellite networks. In some examples, the steps of method 500 may be performed, at least partly, by a router 112 as described herein. The router 112 may utilize a satellite dish antenna 114 and may include one or more processors and one or more non-transitory computer-readable media storing computer-executable instructions that, when executed by the one or more processors, cause the one or more processors to perform the operations of method 500.

At 502, a routing device (e.g., router 112) that is acting as a TCP proxy for a client device may receive, from the client device, a request to communicate data over one or more Wide Area Networks (WANs) to a destination device. In such an example, the one or more networks include a low Earth orbit (LEO) satellite network. In some examples, the request to communicate may be a SYN packet sent from the client device 102 because the client device 102 is attempting to start a TCP connection 120 with a destination device, such as a sever in the application architecture 108.

At 504, the routing device may establish a establishing a first TCP connection with the client device where the first TCP connection utilizing a first TCP congestion-control algorithm. For instance, the routing device, or router 112, may receive the SYN packet and determine that the first TCP congestion-control algorithm used by the client device 102 is less optimal 120 for communicating over the LEO satellite network 106 based on the geographic location, time of day, and/or other parameters. The router 112 may then respond to the SYN packet with a spoof ACK packet that results in the client device 102 believing that it has established a TCP connection with the desired destination device. However, a proxy on the router 112 may terminate the TCP connection 120 on the router 112 itself and the proxy may spoof ACK packets back to the client device 102.

At 506, the routing device may determine that a second TCP congestion-control algorithm is more optimized than the first TCP congestion-control algorithm for transmitting the data over the LEO satellite network.

For instance, the routing device may receive schedule data (e.g., model(s) 228) that indicates a period of time of a day during which it is optimal to communicate over the LEO satellite network 106 using the second congestion-control algorithm. In such examples, determining that the second TCP congestion-control algorithm is more optimized than the first TCP congestion-control algorithm is based at least in part on determining a current time is within the period of time.

As another example, the routing device may determine at least one of a packet-loss characteristic or a variable-delay characteristic associated with a previous TCP connection used to send data via the LEO satellite network. The routing device may further determine that the at least one of the packet-loss characteristic or the variable-delay characteristic violates a threshold, and determine to use the second TCP congestion-control algorithm based at least in part on the at least one of the packet-loss characteristic or the variable-delay characteristic violating the threshold.

At 508, the routing device may establish a second TCP connection with a remote device associated with the destination device where the second TCP connection utilizing the second TCP congestion-control algorithm. The remote device associated with the destination device may be, in some examples, a router 112 that is running a proxy component 116.

At 510, the routing device may receive the data from the client device via the first TCP connection, terminate the first TCP connection, and send the data to the remote device using the second TCP connection. Stated otherwise, the routing device may act as a TCP proxy and utilize TCP congestion-control algorithms that are optimized for a LEO satellite network based on various data or parameters.

In some instances, method 510 may further include receiving, at a remote service associated with the routing device, orbit data indicating an orbital pattern of satellites in the LEO satellite network, and receiving telemetry data from routing devices that transmit traffic via the LEO satellite network. Generally, the telemetry data being indicative of performance issues experienced by the routing device when transmitting the traffic at different times of a day. Further, the method 500 may include training a machine-learning (ML) model to determine optimized TCP congestion-control algorithms for use in communicating over the LEO satellite network at the different times of the day.

Figure 6:
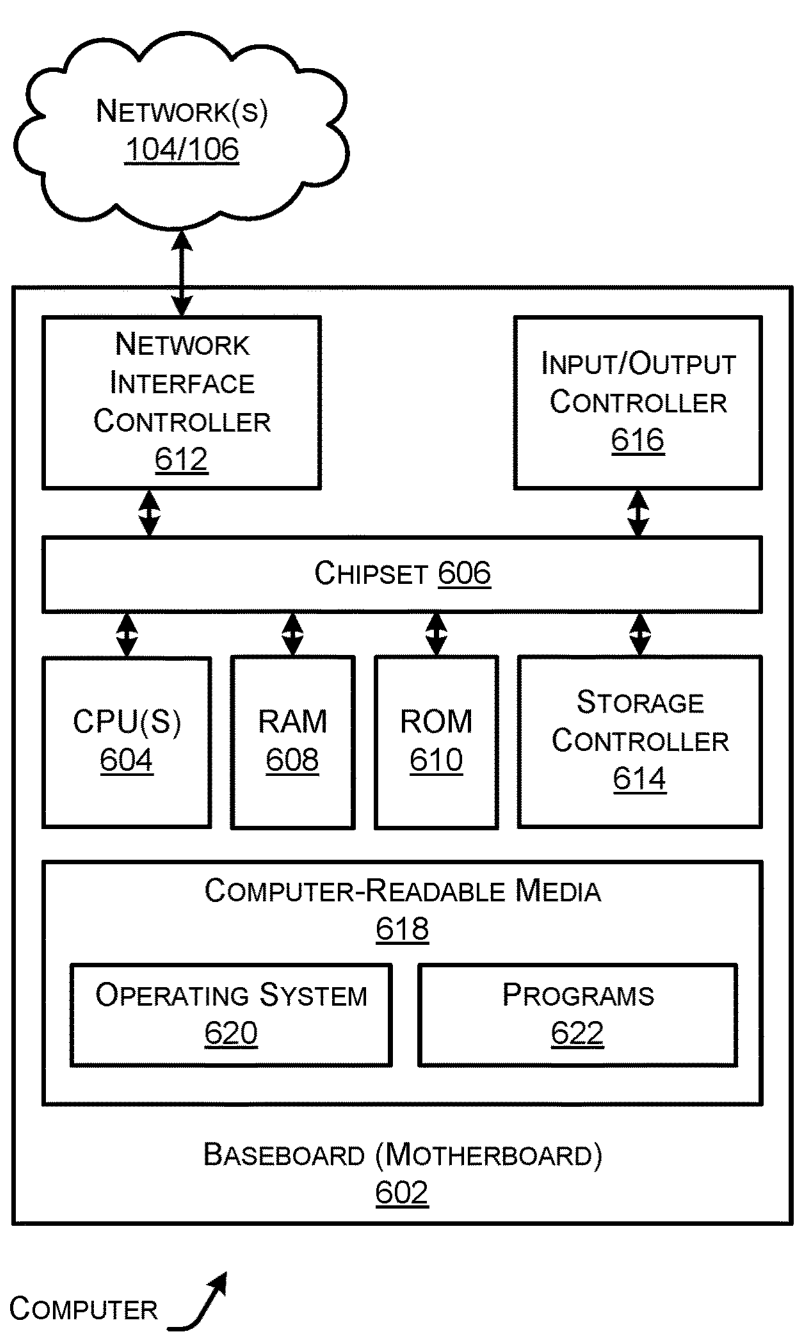
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may in some examples, correspond to a client device 102, server in the application architecture 108, router 112, and/or any other device described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 104/106. The chipset 606 can include functionality for providing network connectivity through a NIC 612, such as a gigabit Ethernet adapter. The NIC 612 is capable of connecting the computer 600 to other computing devices over the network 104/106. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices and/or any components included therein, may be supported by one or more devices similar to computer 600. Stated otherwise, some or all of the operations performed by the components included therein, may be performed by one or more computer devices 600 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at a client device, the method comprising:

determining, at the client device, to communicate data over one or more Wide Area Networks (WANs) to a destination device, the one or more WANs including a low Earth orbit (LEO) satellite network;

determining a geographic location of the client device and a current time of day of the client device;

selecting, from among a group of Transport Control Protocol (TCP) congestion-control algorithms, a particular TCP congestion-control algorithm that is optimized for transmitting the data over the LEO satellite network from the geographic location of the client device and at the current time of day of the client device;

establishing a TCP connection with the destination device or a remote device associated with the destination device, the TCP connection utilizing the particular TCP congestion-control algorithm; and communicating the data from the client device via the TCP connection.

2. The method of claim 1, further comprising:

receiving schedule data that indicates a period of time of a day during which it is optimal to communicate over the LEO satellite network using the particular congestion-control algorithm, wherein selecting the particular TCP congestion-control algorithm from the group of TCP congestion-control algorithms is based at least in part on determining the current time is within the period of time.

3. The method of claim 1, further comprising:

determining at least one of a packet-loss characteristic or a variable-delay characteristic associated with a previous TCP connection used to send data via the LEO satellite network;

determining that the at least one of the packet-loss characteristic or the variable-delay characteristic violates a threshold; and determining to use the particular TCP congestion-control algorithm based at least in part on the at least one of the packet-loss characteristic or the variable-delay characteristic violating the threshold.

4. The method of claim 1, further comprising:

receiving, at a remote service associated with the client device, orbit data indicating an orbital pattern of satellites in the LEO satellite network;

receiving telemetry data from routing devices that transmit traffic via the LEO satellite network, the telemetry data being indicative of performance issues experienced by the client device when transmitting the traffic at different times of a day; and training a machine-learning (ML) model to determine optimized TCP congestion-control algorithms for use in communicating over the LEO satellite network at the different times of the day.

5. The method of claim 1, further comprising:

determining that use of another TCP congestion-control algorithm results in at least one of a packet-loss characteristic or a variable-delay characteristic violating a threshold; and determining to use the particular TCP congestion-control algorithm based at least in part on use of the other TCP congestion-control algorithm resulting in the at least one of the packet-loss characteristic or the variable-delay characteristic that violates the threshold.

6. The method of claim 1, wherein the client device selects the particular TCP congestion-control algorithm, establishes the TCP connection, and communicates the data from the client device via the TCP connection.

7. A client device comprising:

one or more processors; and one or more non-transitory computer-readable media storing computer-executable instructions that, when executed by the one or more processors, cause the one or more processors to perform operations comprising:

determining, at the client device, to communicate data over one or more Wide Area Networks (WANs) to a destination device, the one or more WANs including a low Earth orbit (LEO) satellite network;

determining a geographic location of the client device and a current time of day of the client device;

selecting, from among a group of Transport Control Protocol (TCP) congestion-control algorithms, a particular TCP congestion-control algorithm that is optimized for transmitting the data over the LEO satellite network from the geographic location of the client device and at the current time of day of the client device;

establishing a TCP connection with the destination device or a remote device associated with the destination device, the TCP connection utilizing the particular TCP congestion-control algorithm; and communicating the data from the client device via the TCP connection.

8. The client of claim 7, the operations further comprising:

receiving schedule data that indicates a period of time of a day during which it is optimal to communicate over the LEO satellite network using the particular congestion-control algorithm, wherein selecting the particular TCP congestion-control algorithm from the group of TCP congestion-control algorithms is based at least in part on determining the current time is within the period of time.

9. The client of claim 7, the operations further comprising:

determining at least one of a packet-loss characteristic or a variable-delay characteristic associated with a previous TCP connection used to send data via the LEO satellite network;

determining that the at least one of the packet-loss characteristic or the variable-delay characteristic violates a threshold; and determining to use the particular TCP congestion-control algorithm based at least in part on the at least one of the packet-loss characteristic or the variable-delay characteristic violating the threshold.

10. The client of claim 7, the operations further comprising:

receiving, at a remote service, orbit data indicating an orbital pattern of satellites in the LEO satellite network;

receiving telemetry data from routing devices that transmit traffic via the LEO satellite network, the telemetry data being indicative of performance issues experienced by the client device when transmitting the traffic at different times of a day; and training a machine-learning (ML) model to determine optimized TCP congestion-control algorithms for use in communicating over the LEO satellite network at the different times of the day.

11. The client of claim 7, the operations further comprising:

determining that use of another TCP congestion-control algorithm results in at least one of a packet-loss characteristic or a variable-delay characteristic violating a threshold; and determining to use the particular TCP congestion-control algorithm based at least in part on use of the other TCP congestion-control algorithm resulting in the at least one of the packet-loss characteristic or the variable-delay characteristic that violates the threshold.

12. The client of claim 7, wherein the client device selects the particular TCP congestion-control algorithm, establishes the TCP connection, and communicates the data from the client device via the TCP connection.

13. One or more non-transitory computer-readable media storing computer-executable instructions that, when executed by one or more processors, cause the one or more processors to perform operations comprising:

determining, at a client device, to communicate data over one or more Wide Area Networks (WANs) to a destination device, the one or more WANs including a low Earth orbit (LEO) satellite network;

determining a geographic location of the client device and a current time of day of the client device;

selecting, from among a group of Transport Control Protocol (TCP) congestion-control algorithms, a particular TCP congestion-control algorithm that is optimized for transmitting the data over the LEO satellite network from the geographic location of the client device and at the current time of day of the client device;

establishing a TCP connection with the destination device or a remote device associated with the destination device, the TCP connection utilizing the particular TCP congestion-control algorithm; and communicating the data from the client device via the TCP connection.

14. The one or more non-transitory computer-readable media of claim 13, the operations further comprising:

receiving schedule data that indicates a period of time of a day during which it is optimal to communicate over the LEO satellite network using the particular congestion-control algorithm, wherein selecting the particular TCP congestion-control algorithm from the group of TCP congestion-control algorithms is based at least in part on determining a current time is within the period of time.

15. The one or more non-transitory computer-readable media of claim 13, the operations further comprising:

determining at least one of a packet-loss characteristic or a variable-delay characteristic associated with a previous TCP connection used to send data via the LEO satellite network;

determining that the at least one of the packet-loss characteristic or the variable-delay characteristic violates a threshold; and determining to use the particular TCP congestion-control algorithm based at least in part on the at least one of the packet-loss characteristic or the variable-delay characteristic violating the threshold.

16. The one or more non-transitory computer-readable media of claim 13, the operations further comprising:

receiving, at a remote service, orbit data indicating an orbital pattern of satellites in the LEO satellite network;

receiving telemetry data from routing devices that transmit traffic via the LEO satellite network, the telemetry data being indicative of performance issues experienced by the client device when transmitting the traffic at different times of a day; and training a machine-learning (ML) model to determine optimized TCP congestion-control algorithms for use in communicating over the LEO satellite network at the different times of the day.

17. The one or more non-transitory computer-readable media of claim 13, the operations further comprising:

determining that use of another TCP congestion-control algorithm results in at least one of a packet-loss characteristic or a variable-delay characteristic violating a threshold; and determining to use the particular TCP congestion-control algorithm based at least in part on use of the other TCP congestion-control algorithm resulting in the at least one of the packet-loss characteristic or the variable-delay characteristic that violates the threshold.

* * * * *